A. R. CRIHFIELD.
Improvement in Propelling Cars by Stationary Power.
No. 124,551. Patented March 12, 1872.
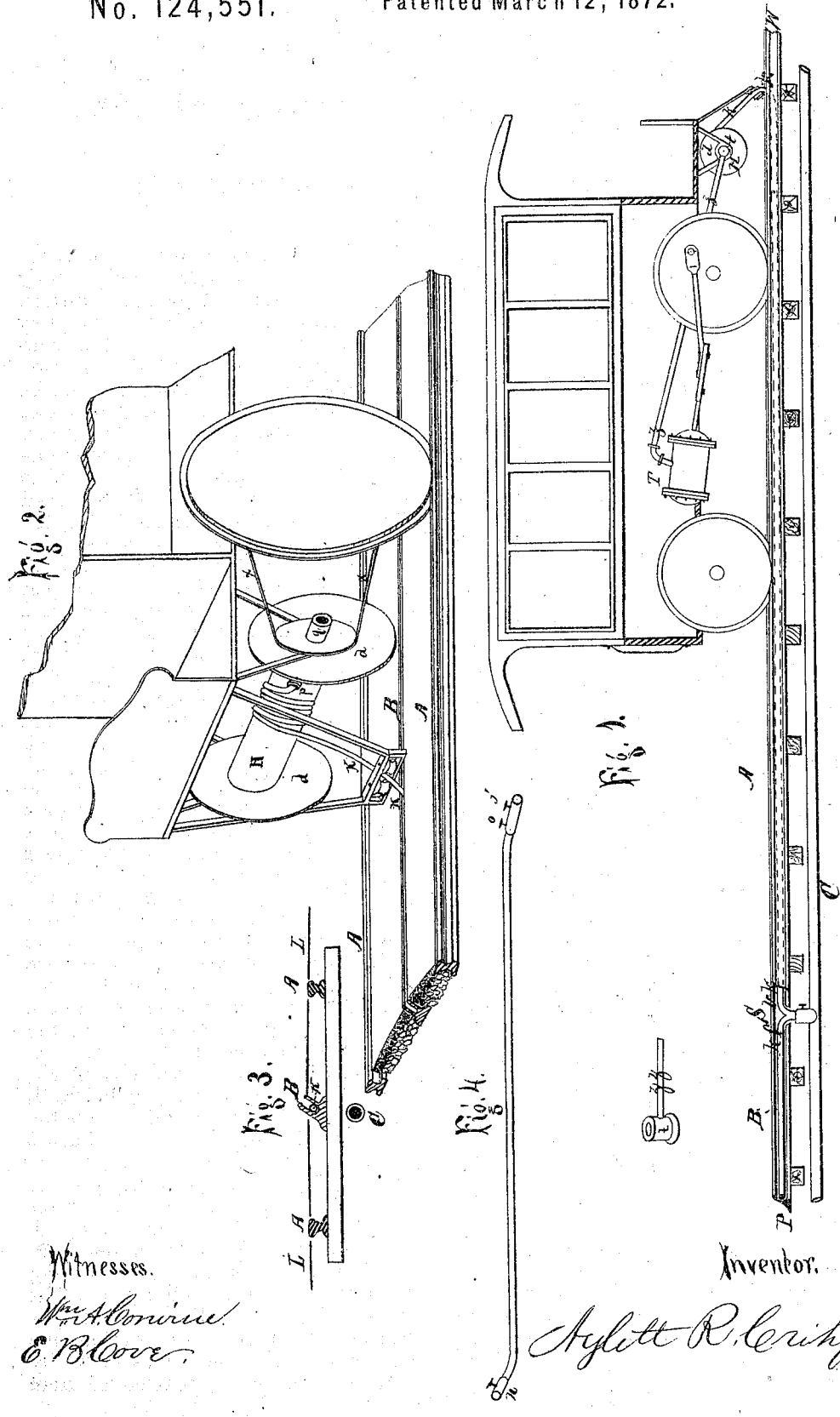

124,551

UNITED STATES PATENT OFFICE.

AYLETT R. CRIHFIELD, OF LINCOLN, ILLINOIS.

IMPROVEMENT IN PROPELLING CARS BY STATIONARY POWER.

Specification forming part of Letters Patent No. 124,551, dated March 12, 1872.

SPECIFICATION.

I, AYLETT RAINS CRIHFIELD, of the city of Lincoln, county of Logan and State of Illinois, have invented certain Improvements in the Manner of Utilizing Stationary Power in Propelling Movable Vehicles by the Use of Compressed Air, of which the following is a specification:

The object attained by my invention is to convey or transmit power, which may be generated or garnered by means of stationary engines, windmills, or other machines, and use the same in other engines or devices upon movable bodies, such as street-cars, which it may be desired to move from one place to another. It is well known that it is often very impracticable to carry within or upon such vehicles the machinery necessary to generate the power to propel the same.

In order that others skilled in the arts and sciences to which my invention belongs may be enabled to make and use the same, I hereby proceed to describe the same.

I attach or accompany these specifications with a series of drawing showing the various parts of my invention, said drawing forming a part of these specifications.

Like letters or figures of reference indicate similar parts in the different drawing.

In order that my invention may be used in propelling any movable body, as aforesaid, it will be necessary that along the entire route, line, or track of such car or vehicle a pipe should be laid of sufficient strength and capacity to admit of safely receiving and transmitting from one end of the route to the other atmospheric air of such pressure per square inch as will suffice to run an engine upon any car or movable body with the desired force and speed. This pipe I fill with compressed air, by means of steam-engines, windmills, or other stationary power.

Figure 1 represents a street-car with my invention attached upon the ordinary track made and used in such cases.

A represents the track, and B represents a groove formed of suitable material in the middle of the road-bed, between the rails, and is to be of such width and depth as to freely receive a flexible pipe or hose, to be hereafter particularly described. Beneath the grade or ground surface, and also beneath the material of which the groove B is formed, is laid an air-tight pipe of suitable strength and capacity to suit the work designed to be accomplished. Said pipe is represented in Figs. 1 and 3 by the letter C. This pipe is connected at suitable places with the stationary engines aforesaid, and said pipe being air-tight must be filled with air from the stationary engine or power to such a degree of pressure per square inch as will suffice to produce the desired motion in the engines to which it is designed to be transmitted, and which are to be placed upon the car or other movable body. For the purpose of utilizing or using the power thus confined in the pipe C, I lay the said pipe off into sections of such length as may be most convenient. In the center of such section I have a stop-cock inserted into the pipe C, as shown in Fig. 1 at S. Said stop-cock is placed below the ground line or grade to protect it from passing objects or vehicles. I then take a piece of flexible pipe or hose of a length equal to one-half of the sections into which the pipe C has been laid off and divided. Said pipe wants to be of some suitable flexible material, such as rubber, its compounds, or allied gums. It is well to wrap or coat said pipe with some suitable substance to prevent wear and tear. Said flexible pipe I represent in Fig. 4, and by the letter $k$ in Figs. 1, 2, and 3. At one end of said pipe $k$, as at $o$, Fig. 4, I place a convenient stop-cock to prevent the escape of air when not in use. I also place upon the end of said pipe $k$, at $j$, another suitable cock for joining said pipe or hose to the engine on the car, &c. In order to bring the pipe $k$ aforesaid into service, I mount upon the car or other body to be propelled an air-tight drum or hollow revolving cylinder, H, Figs. 1 and 2, with the flanges $d$ $d$. I take the end of the flexible hose or pipe, $k$, Figs. 2 and 4, by means of the device at $j$, join the same to the drum or cylinder H, as shown in Fig. 2, at $p$. The other end of said hose or pipe, marked $n$, I join to the main supply C, Figs. 1 and 2, at the station marked S, in Fig. 1. Now, the said flexible pipe $k$ being joined air-tight to the main supply-pipe C at the station S, Fig. 1, is laid in its groove or bed B, Figs. 1 and 2; thence along said groove till it reaches the car or vehicle, as shown by Fig. 1. Said car or vehicle is removed from the station S the entire length of the pipe $k$. The drum or cylinder H, Fig. 2, is mounted on a hollow shaft shown at $q$, Fig. 2. I place over the end of said hollow shaft a cap shown by the letter $t$, near Fig. 2, as having been removed from its place, in order to better show the various parts. Said cap is also shown in Fig. 1 by the said letter $t$ in said Fig. 1 being in place. Said cap is nicely fitted and made air-tight by packing, and oiled to permit the hollow shaft $q$ to revolve inside of it in an air-tight manner. The cap $t$ is connected with a suitable pipe, $z\,z$, in Figs. 1 and 2, leading from the cap $t$ into the engine at T. In this arrangement I have a continuous and open passage of condensed air from the supply-pipe C, Figs. 1 and 3, to the engine at T, Fig. 1. In Fig. 2, at $x\,x$, is shown a band or belt connecting the main axle or revolving shaft of the engine with the revolving drum H. Now, it being desired to operate my invention, the conductor, or other person in charge of the car or vehicle, opens the valve of the engine and permits the condensed air to enter the same. The supply of condensed air from the supply-pipe C being forced forward with sufficient vigor, motion is produced; and as soon as motion is produced the belt $x\,x$ turns the drum H and winds upon itself the flexible pipe. The pipe being flexible permits of its being wound up onto the drum H without in any manner interfering with the free passage of the condensed air through the same. In moving to the station S the flexible pipe will be wound around the drum, and the vehicle being stopped the conductor or other person crosses the band or belt $x\,x$, when motion is again produced and the flexible pipe is unwound and allowed to fall into its groove or bed. The appearance of the flexible pipe $k$, before starting for the station S, is shown at $v$, Fig. 1, and the appearance of said pipe after it has been unwound, after passing the station S, is shown at $f$, Fig. 1. There are other methods of reversing the motion of the drum H on arriving at a station, such as reversible gear or loose pulleys and shifting-belts, any of which are practicable, and are readily operated without stopping.

In this operation the flexible hose or pipe $k$ supplies power from the main pipe C, at the station S, to first propel the vehicle or car to the station S, and then by reversing the motion of the drum H the power from the same source serves to move the machinery till the full length of the pipe $k$ is reached. It will then be necessary to stop, because the amount of pipe on the drum H is expended. By this it will be seen that the pipe $k$ being one-half the length of the section, as before mentioned, serves to carry or conduct air to the engine to drive the car, &c., one-half the distance by winding up, then the other half by unwinding. It may be necessary to say that the entire route to be traversed or traveled must be laid off in sections of equal length in order that when one section has been traversed by winding up and unwinding said flexible pipe that on so reaching the end of said section as at P, in Fig. 1, another section must begin, having its pipe to be wound up, as at the beginning, as shown at W, Fig. 1. The sections are virtually alike—cars or vehicles come and go in regular rotation—so that when one drops the end of a flexible pipe another joins it to the drum at $p$ and goes ahead. When the end of a section is reached and before disengaging the pipe $k$ from the drum H at $p$ it will be necessary to turn the stop-cock at $o$, Fig. 4, to prevent the escape of air till it is called into use by the next car. L, Fig. 3, represents the ground line or grade for the road-bed for street-cars. The groove B, as represented in Fig. 3, is made by slightly inclining the sides of the same to one side, in order that the wheels of vehicles may not enter the same, in consequence of the wheels standing vertical, and for such reason cannot pass down into such groove to the injury of said pipe $k$.

What I claim as new, and desire to secure by Letters Patent of the United States, is—

The flexible pipe $k$, hollow cylinder H, cap $t$, pipe $z\,z$, and inclined grooves B, for working and operating substantially as described.

AYLETT R. CRIHFIELD.

Witnesses:
E. B. CORE,
SAMUEL T. ATKINS.